Nov. 23, 1965 V. H. SØRENSEN 3,219,228
BALL LOCK CLAMPING DEVICES
Filed July 11, 1961 3 Sheets-Sheet 1

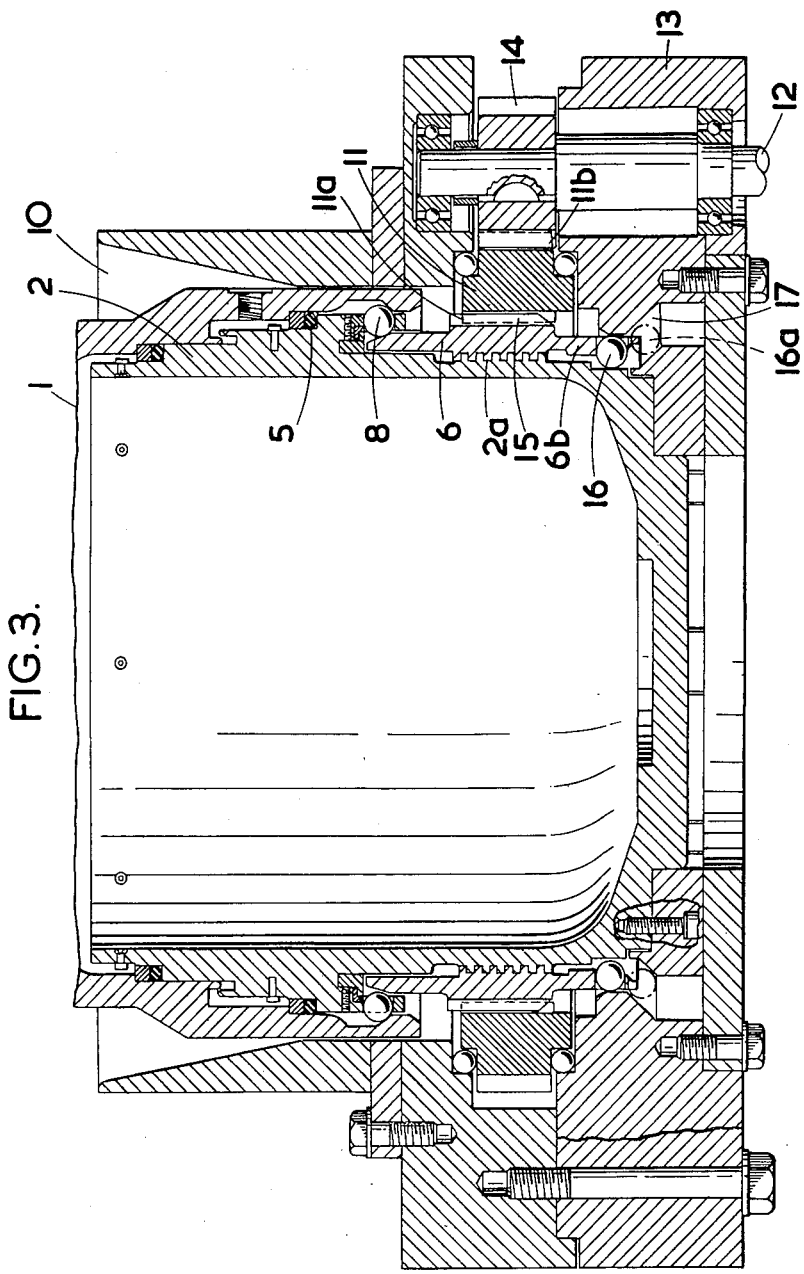

3,219,228
BALL LOCK CLAMPING DEVICES
Viggo H. Sørensen, Dorchester, Dorset, England, assignor to United Kingdom Atomic Energy Authority, London, England
Filed July 11, 1961, Ser. No. 123,289
Claims priority, application Great Britain, July 19, 1960, 25,203/60
7 Claims. (Cl. 220—46)

This invention relates to ball clamping and locking devices. Such devices, as have already been proposed for securing together tubular members, involve the members in relative rotary movement as well as relative axial movement during actuation and the former movement is liable to be detrimental to any deformable sealing members located between the members. Moreover, devices relying merely upon screw threaded engagement to secure the necessary axial clamping movement normally require the application of a substantial torque to overcome the friction of that part of the thread which serves as an axial bearing surface.

The present invention aims to provide a locking device which will draw axially aligned members into locked engagement with one another without seriously impairing the efficiency of any intermediate sealing devices and which can be actuated without the application of a large torque.

According to the invention, means for drawing together and locking two, first and second, interfitting tubular members against a separating resistance includes an annular row of balls mounted between the members and retained in a cage which allows the balls to roll in part-spiral paths, a nut having a ball contacting surface mounted on a first member so as to be movable relative thereto towards and away from said cage, said member having an abutment surface which co-operates with said ball contacting surface to impart a rolling motion to the balls along a part spiral path, the second member having a locking recess with a part conical surface engageable by the balls during their rolling motion initially to draw the members together and then to lock them as the balls enter the recess. The ball contacting surfaces of the abutment and of the said other member may define an annular Vee section groove, in which the balls roll in contact with the nut during actuation of the device. The ball contacting surface of the nut may be formed by a part conical portion more steeply inclined at the end than further up the sleeve of the nut so that on a short initial axial movement of the nut the balls are moved radially quickly into contact with the part conical portion and then move in a part spiral path as the nut makes further axial movement. The balls act as a thrust bearing when moved by the nut, between the abutment surface and the part conical surface of the second member.

The invention will now be described with reference to the accompanying drawings in which the two tubular members form two parts of a cylindrical container.

FIG. 3 shows the remote handling tool applied to a container similar to that shown in FIG. 1 for remotely disconnecting the two parts of the container.

Figure 1:
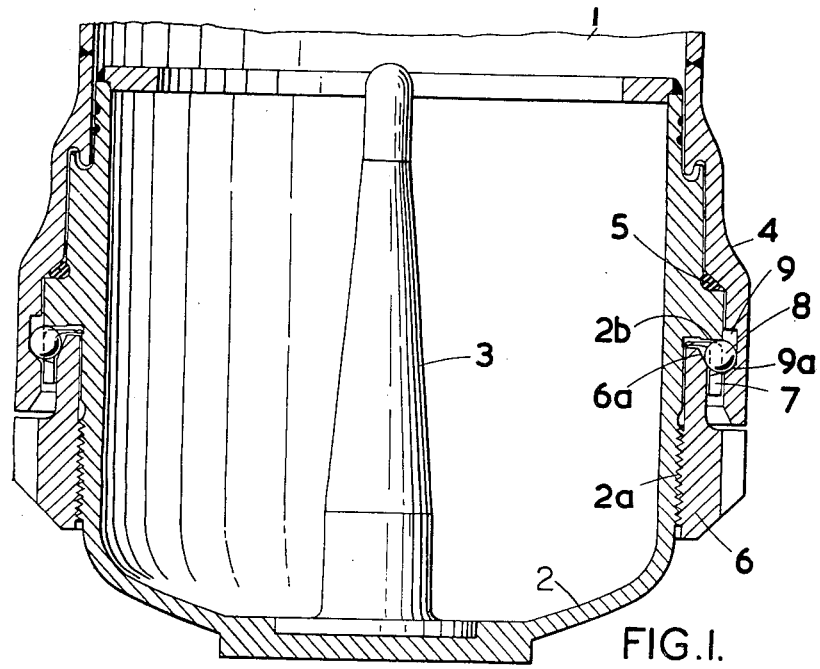
FIG. 1 shows in cross-section a portion of a two part cylindrical container for housing a nuclear fuel element and detachably connected by a clamping and locking device embodying the invention.

In FIG. 1 the container comprises a cylindrical shell 1 and a cylindrical end closure cap 2 which in this case is formed with a central spike 3 for locating a cluster of nuclear fuel elements. The shell 1 has an enlarged diameter skirt portion 4 adapted to fit over the cap 2 and form therewith a hermetic seal effected through the deformation of a resilient O-ring 5 engaging with complementary shoulders on the skirt 4 and cap 2 as shown. In order to avoid any scuffing on the ring 5 it is required that the two parts of the container are drawn together by an axial clamping force and when drawn together locked in a closed condition.

Figure 4:
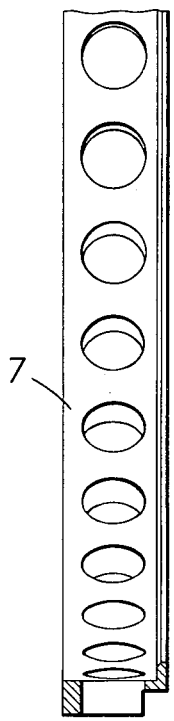
FIGS. 4 and 5 show respectively one half of a retainer cage and a circumferential cross-section of one of the balls in the cage.
Figure 5:
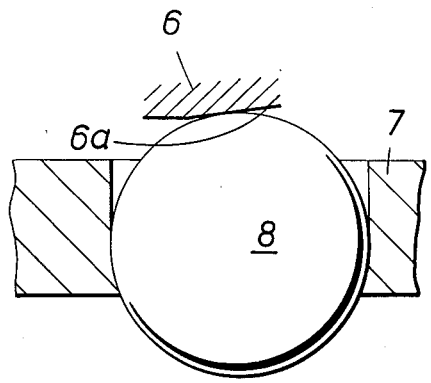

The cap 2 carries a captive nut 6 which engages a short screw threaded portion 2a on the cap 2 and which is rotatable thereon to move axially towards and away from an external shoulder 2b defining a radially extending abutment surface and formed on the outside of the cap 2. Between the shoulder 2b and the screw threaded portion 2a, the cap supports a ball bearing including a rotatable retainer ring or cage 7 which retains a plurality of balls 8 forming a thrust bearing for nut 6. The retaining ring 7 allows the balls 8 a free rolling action and a limited degree of radial displacement in response to axial movement of the nut, relative to the retainer ring 7, when the nut 6 is rotated on the cap, the nut being formed with a part-conical portion 6a of an acute cone angle to ensure that the balls roll quickly outwards as the nut is actuated (FIGS. 4 and 5).

The adjacent part of the skirt portion 4 is provided with an internal annular locking recess 9 which has one part-conical face 9a to form in co-operation with the portion 2b of the cap a Vee section annular groove, or track, in which the balls 8 can run when they are rolled radially outwards in a part-spiral path. The balls 8 thus form a thrust bearing when the balls are forced outwards by the nut between the abutment surface and the conical surface 9a.

Figure 2A:
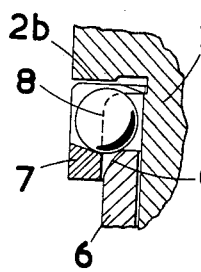
FIGS. 2a–2d show parts of the ball clamping and locking device at successive stages of operation.
Figure 2B:
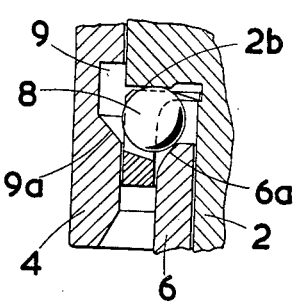
Figure 2C:
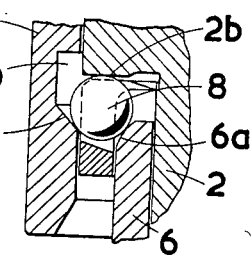
Figure 2D:
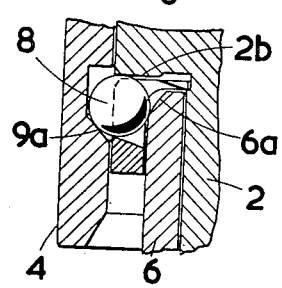

Th operation of the locking device is clearly shown in FIGS. 2a–2d. FIG. 2a shows one of the balls 8 in the retainer ring 7 with the nut 6 in its retracted position on the cap 2. FIG. 2b shows the position of the shell skirt 4 when the shell is lowered into position over the cap and the nut 6 has been advanced on its thread so as to just lift the balls 8 in their retainer ring into contact with the shoulder 2b. FIG. 2c shows the nut 6 in a further advanced position in which the conical portion of the nut has rolled the ball along the shoulder 2b radially outwards and into contact with the annular track formed by the face 9a of the recess 9. As the nut 6 is advanced from its position in FIG. 2c to that shown in FIG. 2d, the ball 8 rotates with one rotational component imparted by rotation of the nut and a further component constrained by its radially outward motion along the face 9a. The resultant path of motion of the balls is thus a part-spiral one. As the balls are prevented from moving axially by virtue of the shoulder 2b, the shell is obliged to be drawn axially downwards over the cap until the ball reaches the locked position shown in FIG. 2d.

FIG. 3 shows the device of FIG. 2 applied to a remote control actuating tool such as may be used in a radioactive environment e.g. a "hot cell" (i.e. a shielded compartment in which operation on active member can be performed). The location of the shell and its closure cap within the "hot cell" is provided by a reception cup 10 which houses an annular gear 11 having internal dogs and external gear teeth 11a, 11b, respectively. A drive shaft 12 extends through an extension 13 of the base of the cup 10 and carries a spur gear 14 in mesh with external teeth 11b. The nut 6 and the locking mechanism are similar to that shown in FIG. 1. The external surface of the nut is formed with dogs 15 which can engage with the internal dogs 11a and that the nut has a skirt position 6b which is apertured to house a number of annularly spaced balls 16.

The latter co-operate with an axially staggered annular channel 17 in the base of cup to form a ball catch described below.

When the cap, attached to shell, is inserted in the cup 10 by means of a remote controlled hoist (not shown), the dogs 15 engage with the internal dogs 11a of annular gear 11 and the balls 16 engage with the upper shoulder of the channel 17 and are thereby moved radially inwards into contact with the cap 2 in the position shown in FIG. 3.

To detach the cap 2 from the shell 1, the drive shaft 12 is rotated to rotate the nut 6 through spur gear 14 and annular gear 11 in a sense to screw the nut downwards. When the nut 6 has travelled downwards a distance sufficient to release the balls 8 of the ball lock from the surface 9a (whence they move radially inwards under their own weight), the balls 16 of the ball catch assume a position indicated in dotted outline at 16a in the inclined portion of the axially staggered channel 17. The shell 1 can then normally be lifted off the cap 2 which remains in the reception cup 10. If, however, there is any sticking of the sealing rings between the cap and the shell with the tendency for the cap to be carried upwards along with the shell, the balls at 16a engage on the outer annular surface of the channel 17 so locking the cap (and therewith the shell) against upwards movement. This prevents the cap being lifted out of the cup inadvertently with the possibility of it subsequently detaching itself under its own weight and falling into an inaccessible position.

To replace the cap 2 on a shell the above procedure is reversed, the shell is lowered vertically downwards so that its open end passes over the upper part of the cap, the balls 8 being retracted (radially) in their retaining ring by their own weight. The shell 1 then rests on its sealing ring whilst the nut 6 is rotated by the drive shaft to screw up the nut so drawing the shell and cap together axially by radial displacement of the balls 8 which are allowed to roll in contact with the inclined surfaces 6a, 9a and the abutment surface 2b, only a small torque is needed to rotate the nut 6.

In a possible variant of the arrangement shown in FIGS. 1 and 2 the ball contacting surface of the nut are inclined in the opposite sense and radial component of motion is imparted to the balls by movement of the nut in a direction away from the abutment surface.

I claim:

1. Apparatus for drawing together and locking two, first and second, interfitting coaxial tubular members against a separating resistance, comprising: first and second interfitting coaxial tubular members, and annular row of balls mounted between the members and retained in a rotatable cage which permits the balls to roll in part spiral paths, an annular threaded nut having a ball contacting surface mounted on said first member around the annulus between said members so as to be axially movable relative thereto towards and away from the cage and into engagement with said balls, said first member having an abutment surface which co-operates with the ball contacting surface of said nut to impart a rolling motion to the balls along a part spiral path, said second member having a locking recess with a part conical surface engageable by the balls during said rolling motion initially to draw the members axially together and then to lock them together as the balls enter the recess.

2. A device as claimed in claim 1 in which the first member is the male portion of a tubular coupling carrying deformable sealing rings for engagement with the second member which forms the female portion.

3. A device as claimed in claim 2 in which the first member is formed by a closure cap for the second member which constitutes a tubular container.

4. Apparatus as claimed in claim 1 in which the ball contacting surface of the nut is inclined in a direction such that radial motion is imparted to the balls as the nut is moved axially away from the abutment surface.

5. Apparatus as claimed in claim 1 in which the retainer ring is arranged to limit the movement of the balls in one radial direction, their movement in the other radial direction being restricted by the ball contacting surface of the nut.

6. A ball locking device for drawing together and locking two interfitting tubular members in which the members are drawn together and locked by the axial movement of a nut mounted on one member for axial movement towards an abutment surface to impart a radial component of motion to a plurality of balls and move them into engagement with a part-conical surface on the other member leading to a locking recess in said other member and having a thrust bearing between said part-conical surface and said abutment surface formed by a rotatable mounting or cage for said balls which permits a limited radial displacement of the balls in one direction.

7. Apparatus for drawing together and locking two interfitting members against a separating resistance, comprising: first and second interfitting co-axial tubular members, a rotatable cage rotatably mounted on said first member and supporting a row of balls between the first member and the second member so as to allow the balls to roll around the annulus between the members and to move radially in said annulus, an annular axially facing abutment surface on said first member, an annular nut-like member threadably mounted on said first member around said annulus for movement axially relative to said first member toward and away from said cage, said nut-like member having a cam surface thereon for co-operating with said abutment surface to impart a rolling motion to said balls along a spiral path, said second member having an annular recess with a substantially conical surface for drawing said first and second members axially together as said balls follow a spiral path around said annulus and radially along said conical surface into said recess and for locking said members together as said balls enter said recess.

References Cited by the Examiner

UNITED STATES PATENTS

| | | | |
|---|---|---|---|
| 2,332,685 | 10/1943 | Auld et al. | 81—57 |
| 2,774,508 | 12/1956 | Larsen | 220—46 |
| 2,781,942 | 2/1957 | Eastburg | 220—46 |
| 2,869,910 | 1/1959 | Fisher et al. | 220—55 |
| 2,907,242 | 10/1959 | Chakroff | 81—57 |
| 2,967,640 | 1/1961 | Roberts | 220—25 |

FOREIGN PATENTS 17,310  12/1915  Great Britain.

THERON E. CONDON, *Primary Examiner.*

EARLE J. DRUMMOND, *Examiner.*